US007859181B2

(12) United States Patent  
Ozolins et al.

(10) Patent No.: US 7,859,181 B2  
(45) Date of Patent: *Dec. 28, 2010

(54) BEZEL-LESS ELECTRONIC DISPLAY

(75) Inventors: Helmars E. Ozolins, Orient, NY (US); Masamichi Udagawa, New York, NY (US)

(73) Assignee: Bloomberg Finance L.P., New York, NY (US)

( * ) Notice: Subject to any disclaimer, the term of this patent is extended or adjusted under 35 U.S.C. 154(b) by 393 days.

This patent is subject to a terminal disclaimer.

(21) Appl. No.: 11/932,128

(22) Filed: Oct. 31, 2007

(65) Prior Publication Data

US 2008/0074028 A1  Mar. 27, 2008

Related U.S. Application Data

(63) Continuation of application No. 11/085,762, filed on Mar. 21, 2005, now Pat. No. 7,298,076, which is a continuation of application No. 10/300,648, filed on Nov. 20, 2002, now Pat. No. 6,919,678, which is a continuation of application No. 29/166,842, filed on Sep. 3, 2002, now Pat. No. Des. 500,037, and a continuation-in-part of application No. 29/166,843, filed on Sep. 3, 2002, now Pat. No. Des. 496,362, and a continuation-in-part of application No. 29/166,844, filed on Sep. 3, 2002, now Pat. No. Des. 496,363.

(51) Int. Cl.  
*H01J 31/00* (2006.01)  
*H01J 5/16* (2006.01)

(52) U.S. Cl. .................. 313/479; 313/477 R; 313/110; 362/367; 359/609; 220/2.1 R

(58) Field of Classification Search ....................... None  
See application file for complete search history.

(56) References Cited

U.S. PATENT DOCUMENTS 4,740,786 A   4/1988   Smith  
D305,646 S   1/1990   Kato et al.

(Continued)

FOREIGN PATENT DOCUMENTS

EP   0 403 760   4/1990

(Continued)

OTHER PUBLICATIONS

Bloomberg LP, "The Bloomberg® Flat Panel," brochure, Copyright 2000, 4 pages.

*Primary Examiner*—Ashok Patel  
(74) *Attorney, Agent, or Firm*—Frank J. DeRosa; Frommer Lawrence & Haug LLP

(57) ABSTRACT

A bezel-less display is disclosed that includes an electronic display device and a cover. The electronic display device has an image-displaying portion and another portion adjacent the image-displaying portion along at least one side. The cover is positioned adjacent the electronic display device and includes a first portion positioned adjacent the image-displaying portion of the display device and a second portion positioned adjacent the other portion of the display device. The optical properties of the first and second portions of the cover are selected to present an appearance of a uniform cover without a bezel when the display device is not displaying an image. The optical properties of the first portion are also selected to transmit images displayed on the image-displaying portion. Preferably, the optical properties of the second portion are selected to mask the other portion of the display device. A secondary display device may also be provided that presents an image, such as a logo, independently of whether the other or main electronic display device is displaying an image.

6 Claims, 10 Drawing Sheets

U.S. PATENT DOCUMENTS

| | | | |
|---|---|---|---|
| D305,647 S | 1/1990 | Kato et al. | |
| 5,066,112 A * | 11/1991 | Lynam et al. | 359/267 |
| 5,076,524 A | 12/1991 | Reh et al. | |
| 5,153,575 A | 10/1992 | Watts, Jr. et al. | |
| 5,170,156 A | 12/1992 | DeMond et al. | |
| 5,220,442 A | 6/1993 | Dingwall et al. | |
| 5,467,102 A | 11/1995 | Kuno et al. | |
| 5,534,888 A | 7/1996 | Lebby et al. | |
| 5,609,938 A | 3/1997 | Shields | |
| 5,673,170 A | 9/1997 | Register | |
| 5,687,939 A | 11/1997 | Moscovitch | |
| D395,041 S | 6/1998 | Leveridge et al. | |
| D395,298 S | 6/1998 | Rosen | |
| D404,026 S | 1/1999 | Hasegawa | |
| 5,904,328 A | 5/1999 | Leveridge et al. | |
| 5,949,643 A | 9/1999 | Batio | |
| 5,997,378 A * | 12/1999 | Dynka et al. | 445/25 |
| D425,036 S | 5/2000 | Copus et al. | |
| 6,094,340 A | 7/2000 | Min | |
| RE36,978 E | 12/2000 | Moscovitch | |
| 6,189,842 B1 | 2/2001 | Gull et al. | |
| 6,212,068 B1 | 4/2001 | Rooyakkers et al. | |
| 6,216,989 B1 | 4/2001 | Shioya et al. | |
| 6,233,138 B1 | 5/2001 | Osgood | |
| 6,268,892 B1 | 7/2001 | Nishizawa et al. | |
| 6,276,655 B1 | 8/2001 | Byoun | |
| 6,343,006 B1 | 1/2002 | Moscovitch et al. | |
| D458,257 S | 6/2002 | Rosen et al. | |
| D458,603 S | 6/2002 | Lee | |
| D458,604 S | 6/2002 | Ma et al. | |
| D458,927 S | 6/2002 | Wang et al. | |
| 6,449,143 B2 | 9/2002 | Rooyakkers et al. | |
| 6,566,808 B1 | 5/2003 | Duggal et al. | |
| 6,575,419 B1 | 6/2003 | Masuda et al. | |
| 6,919,678 B2 * | 7/2005 | Ozolins et al. | 313/479 |
| 7,298,076 B2 * | 11/2007 | Ozolins et al. | 313/479 |
| 2002/0011544 A1 | 1/2002 | Bosson | |
| 2002/0020792 A1 | 2/2002 | Lee | |
| 2002/0130981 A1 | 9/2002 | Ma et al. | |
| 2002/0149906 A1 | 10/2002 | Ichimura | |

FOREIGN PATENT DOCUMENTS

| | | |
|---|---|---|
| EP | 2000-196718 | 7/2000 |
| EP | 1 209 513 | 5/2002 |
| JP | 49-118441 | 11/1974 |
| JP | 4-72272 | 6/1992 |
| JP | 11 133871 | 5/1999 |
| JP | 11133871 | 5/1999 |
| JP | 11352897 | 12/1999 |
| JP | 2002-093330 | 3/2002 |

* cited by examiner

BEZEL-LESS ELECTRONIC DISPLAY

CROSS-REFERENCE TO RELATED APPLICATIONS

This application is a continuation of application Ser. No. 11/085,762, filed Mar. 21, 2005 now U.S Pat. No. 7,298,076, which is a continuation of application Ser. No. 10/300,648, filed Nov. 20, 2002 (now U.S. Pat. No. 6,919,678), which is a continuation-in-part and claims priority of U.S. Design application Ser. No. 29/166,842 now U.S. Pat. No. D,500,037, U.S. Design application Ser. No. 29/166,843 now U.S. Pat. No. D,496,362, and U.S. Design application Ser. No. 29/166, 844 now U.S. Pat. No. D,496,363, all of which were filed on Sep. 3, 2002, and all of which are hereby incorporated by reference into this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to electronic displays. More particularly, the present invention relates to an electronic display without a bezel, i.e. a bezel-less electronic display.

Electronic displays, such as flat panel monitors used with computers or flat panel televisions, generally have a bezel or frame surrounding a display screen or portion of the electronic display.

SUMMARY OF THE INVENTION

The invention provides a bezel-less electronic display comprising an electronic display device having an image-displaying portion and a cover positioned adjacent the electronic display device that are mounted in an assembly without a bezel. The cover may also be referred to as a lens in the context of an electronic display. However, such lenses typically do not refringe (e.g., focus or diverge) light. The cover overlays the image-displaying portion of the display device and forms a front of the electronic display. The cover also overlays any portion of the display device outside of the image-displaying portion that is visible from the viewing side or front of the electronic display. Thus, the front of the display is presented as a cover without a bezel. Preferably, the cover and the display device are mounted to an enclosure which forms the rear and side of the electronic display. The cover and display device may be mounted or assembled into an assembly in any suitable manner, some of which, including preferred embodiments, are disclosed herein. Also, the cover, display device and enclosure, may be mounted or assembled into an assembly in any suitable manner, some of which, including preferred embodiments, are disclosed herein. For example, the cover and display device may be assembled into a sub-assembly and this sub-assembly may be mounted in an enclosure to form an assembly.

As discussed herein, electronic display devices typically include another portion outside of and at the periphery of the image-displaying area, which function as a frame or support for the display device, or perform other functions. The cover overlays the image-displaying portion and the other portion of the display device. Thus, the cover provides that portion of the electronic display that is exposed to or faces a user viewing the electronic display, i.e., provides in a bezel-less fashion the front of the electronic display.

Depending upon parameters selected for the cover, different bezel-less effects may be provided. For example, a flat cover, which is preferred, presents a flat, bezel-less front. However, other configurations may be used depending upon the effect desired. For example, curved configurations may be used. Such curved configurations are curved in the sense that the cover has a curved outer surface. Configurations that have other surface structures may also be used. Regardless of the cover configuration, the cover is mounted in a bezel-less fashion as described herein.

The cover includes at least a first and second portion, with the first portion overlaying the image-displaying portion and the second portion overlaying the other portion to the display. The portions of the cover overlaying the image-displaying portion and the other portion of the display preferably have optical properties selected to provide a desired appearance across the cover when no image is being displayed by the image-displaying portion (e.g., when the image-displaying portion is darkened or presents a screen of a given color), or when an image is being displayed by the image-displaying portion (e.g., a graphic or text image), or both. The optical properties of first portion are also selected with regard to transmission of images therethrough from the image-displaying portion of the display device, for example to provide for a high transmissivity.

The optical properties of the portions of the cover overlaying the image-displaying portion and the other portion of the display device can be selected so that the portions present a uniform appearance when the display device is not displaying an image. In the preferred embodiment, the optical properties are selected to provide a uniform darkened appearance across both portions of the cover when the image-displaying portion is darkened. The optical properties of the two portions can be selected to also provide a desired effect when the display device is displaying an image. For example, the optical properties of the portion of the cover overlaying the other portion of the display device can be selected to provide a border of a desired color which partially or completely masks, obscures or otherwise reduces the visibility of the other portion of the display device.

Regardless of the optical properties of the portion of the cover overlaying the other portion of the display device, a flat cover in accordance with the invention provides a flush or flat appearance due to elimination of a bezel. However, covers having configurations other than flat can provide other bezel-less appearances. The optical properties of the portion of the cover overlaying the other portion of the display device may be selected to present a desired border appearance, particularly when the display device is displaying an image. In the preferred embodiment, the portion of the cover overlaying the other portion is opaque, and the color of the opaque portion may be selected to provide a desired appearance. Cover properties such as shape, configuration, size, etc., may also be selected to provide a desired bezel-less effect.

In a preferred embodiment of the invention, the optical properties of the second portion of the cover are also selected to partially or completely mask or obscure or otherwise reduce the visibility therethrough of the other portion of the display device. This may be achieved where the second portion has low transmissivity or is opaque, e.g., has an opaque coating. In this embodiment, the second portion presents a border or frame appearance. With a flat cover, the frame or border appears flush with any image being presented by the image-displaying portion of the display device. In a preferred embodiment of the invention, the second portion of the cover comprises opaque material having the same red, green, and blue color values as the image-displaying portion of the display device when no image is displayed thereon. This provides the effect of a borderless, frameless and bezel-less front when the display device is not displaying an image.

In one embodiment, the second portion of the cover surrounds and is coplanar with the first portion, i.e., together they form a flat cover. Preferably, the flat cover comprises a sheet including the first and second portions, i.e., the first and second portions of the cover form different regions of the sheet. In a preferred embodiment of the invention, the first portion of the sheet comprises a tint and the second portion is opaque, e.g., has an opaque coating. The second portion may also comprise a tint, the same or different from the tint of the first portion. Preferably the tint of the first and second portions is the same so that a sheet with a uniform tint may be provided, and the sheet is provided with an opaque coating on the second portion. The tint, at least for the first portion, is preferably a neutral tint, e.g., a neutral gray tint, that does not noticeably alter the color of images transmitted through the first portion. Tinting and/or coating as disclosed herein may also be applied to covers that are not a sheet.

The invention also provides a composite electronic display comprising a main display device and secondary display device. The main display device may be conventional, or may comprise the inventive electronic display disclosed herein. The secondary display device presents one or more images independently of the main display device, with the image(s) being presented outside of an image-displaying portion of the main display device. In one embodiment, the secondary display device generates a single, fixed image, such as a corporate logo, advertisement, licensed character, personalized image or message, etc.

The secondary display device preferably displays an image both when the main display device is displaying an image and when the main display device is not displaying an image, e.g., when the main display device is darkened or off altogether. The image presented by the secondary display device is displayed even when no power is provided to the main display device. For example, the secondary display device may display its image as long as outside power is provided to the composite electronic display or as long as battery power is supplied to the secondary display device.

In accordance with a preferred embodiment of the invention, the composite electronic display comprises a bezel-less electronic display, as disclosed herein, and a secondary display device positioned to provide its image(s) in the second portion of the cover. The secondary display device comprises a light source and structure defining an image. For example, the light source can be a light emitter such as an LED or lamp, and the image-defining structure can be a part of the second portion of the cover having contrasting optical properties that define the image. In this embodiment, the image is fixed. Alternatively, the light source can be an LCD or other display device that includes structure for generating an image, fixed, changeable or dynamic. The LCD or other display device can also generate a fixed image by providing light therefrom to contrasting optical properties in the second portion of the cover as disclosed herein.

The invention also provides a method for providing a bezel-less electronic display. The method comprises mounting or assembling a cover, having first and second portions, with a display device including an image-displaying portion and another portion extending along at least a portion of a side thereof, so that the first portion of the cover overlays the image-displaying portion and the second portion of the cover overlays the other portion of the display device; and selecting the optical properties of the first and second portions so that the cover presents a desired appearance when the image-displaying portion of the display device is not displaying an image. The optical properties may also be selected so that the cover presents a desired border appearance when the image-displaying portion is displaying an image.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
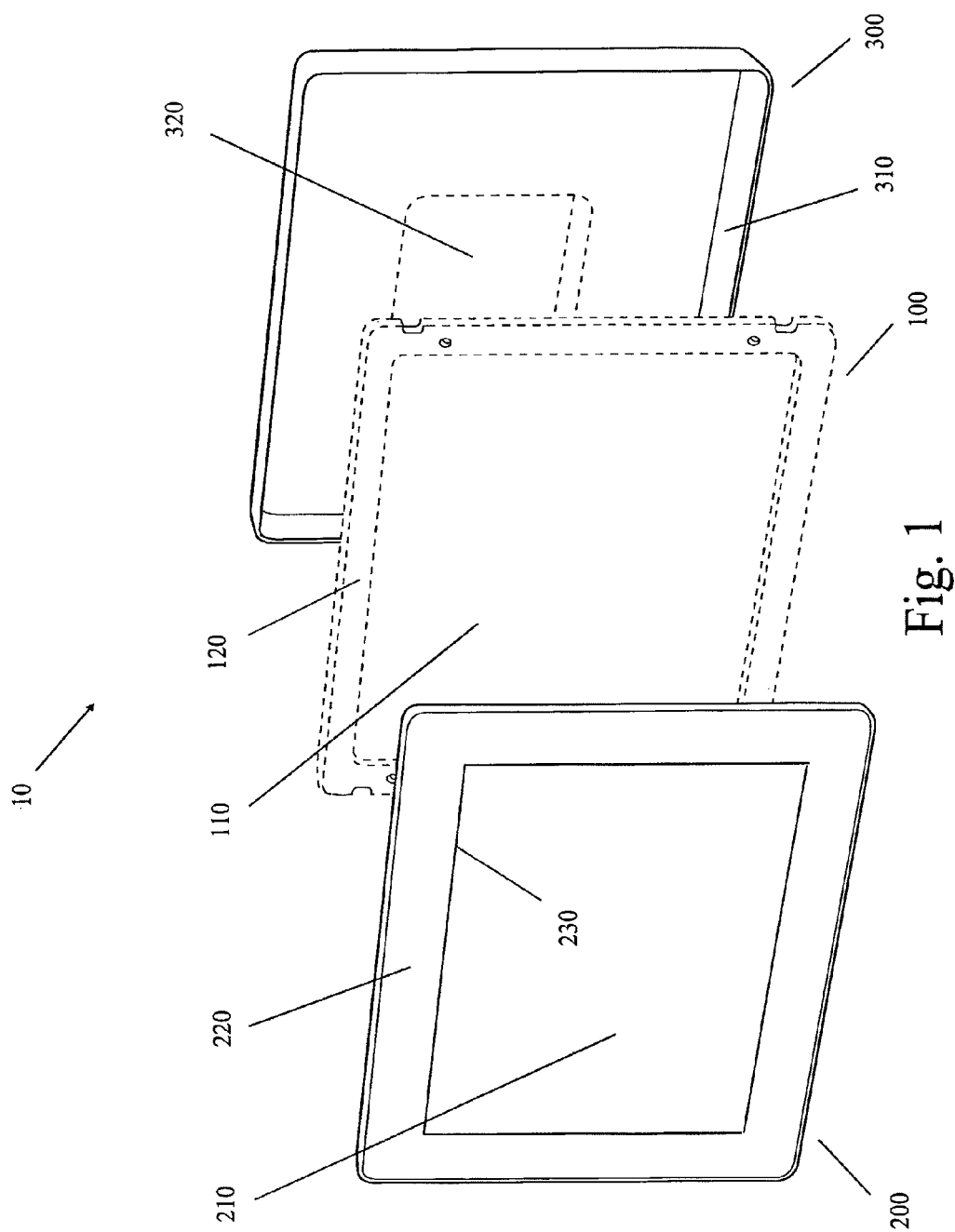
FIG. 1 is an exploded perspective view of an electronic display in accordance with an embodiment of the invention.

According to a preferred embodiment of the invention depicted in FIG. 1, the electronic display 10 comprises an electronic display device 100, a cover 200 and an enclosure 300 to which the display device 100 and the cover 200 are mounted. (Some of the components shown in the figures are exaggerated and shown somewhat schematically for purposes of explanation, and may not be to scale.)

The electronic display device 100 may be conventional and may comprise any device capable of generating and presenting images to a user, such as, for example, an LCD panel. An example of an electronic display device that may be used with the invention is the TFT LCD Model LTM170EI from Samsung Electronics Co., Ltd.

The electronic display device 100 (FIG. 1) includes an image-displaying portion 110 on which images generated by the display device are presented to a user. For example, the image-displaying portion 110 of display device 100 may comprise the display area of an LCD panel. The side of the display device 100 on which images are presented to a user may be referred to as the front of the device.

The electronic display device 100 (FIG. 1) also includes another portion 120 that is visible from the front of the display device 100, e.g., viewable by a user looking at the front of display device 100. The other portion 120 may comprise any component part or parts of display device 100 other than the image-displaying portion 110 that are visible from the front of display device 100, e.g., a frame or support for the display device to support the display device or for mounting the display device, or for other purposes. In the embodiment depicted in FIG. 1, the other portion 120 extends adjacent and surrounds the image-displaying portion 110. The other portion 120 may be configured and located other than as shown in FIG. 1 depending upon the particular display device.

For example, where display device 100 (FIG. 1) is an LCD, the other portion 120 is referred to as the LCD frame, that may serve a variety of functions, such as, for example, those described above. Where the display device 100 is an LCD, the portion 120 may contain holes, as shown for example in FIG. 1, for mounting screws that attach the display device to the enclosure 300.

Figure 2:
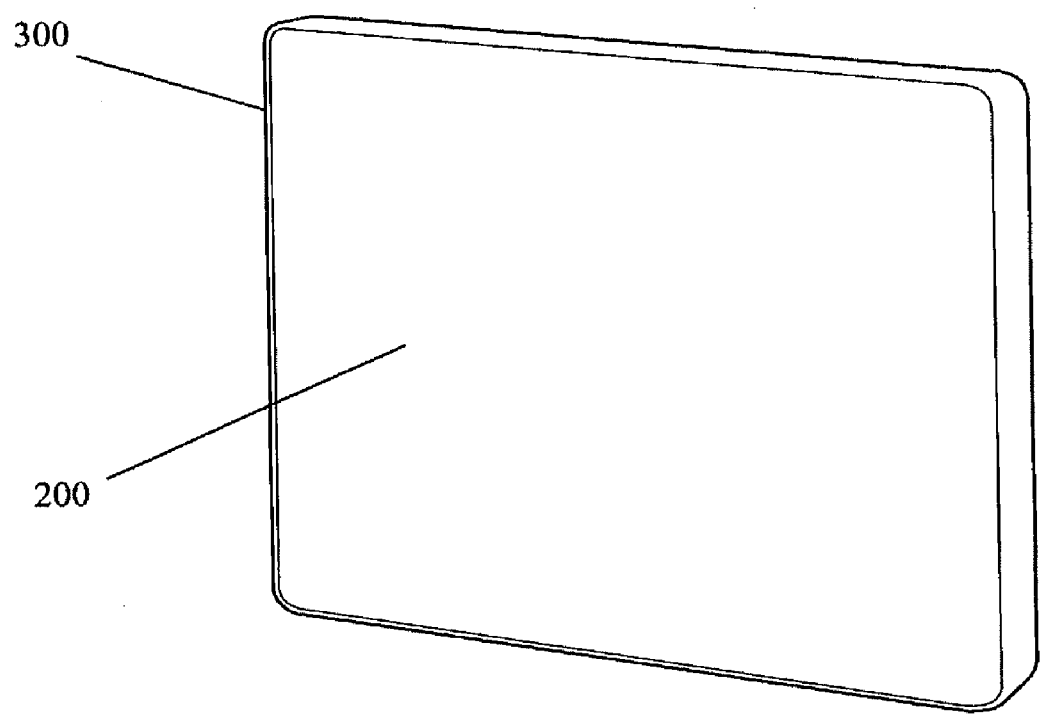
FIG. 2 is a perspective view of the electronic display depicted in FIG. 1 when no image is displayed.
Figure 5:
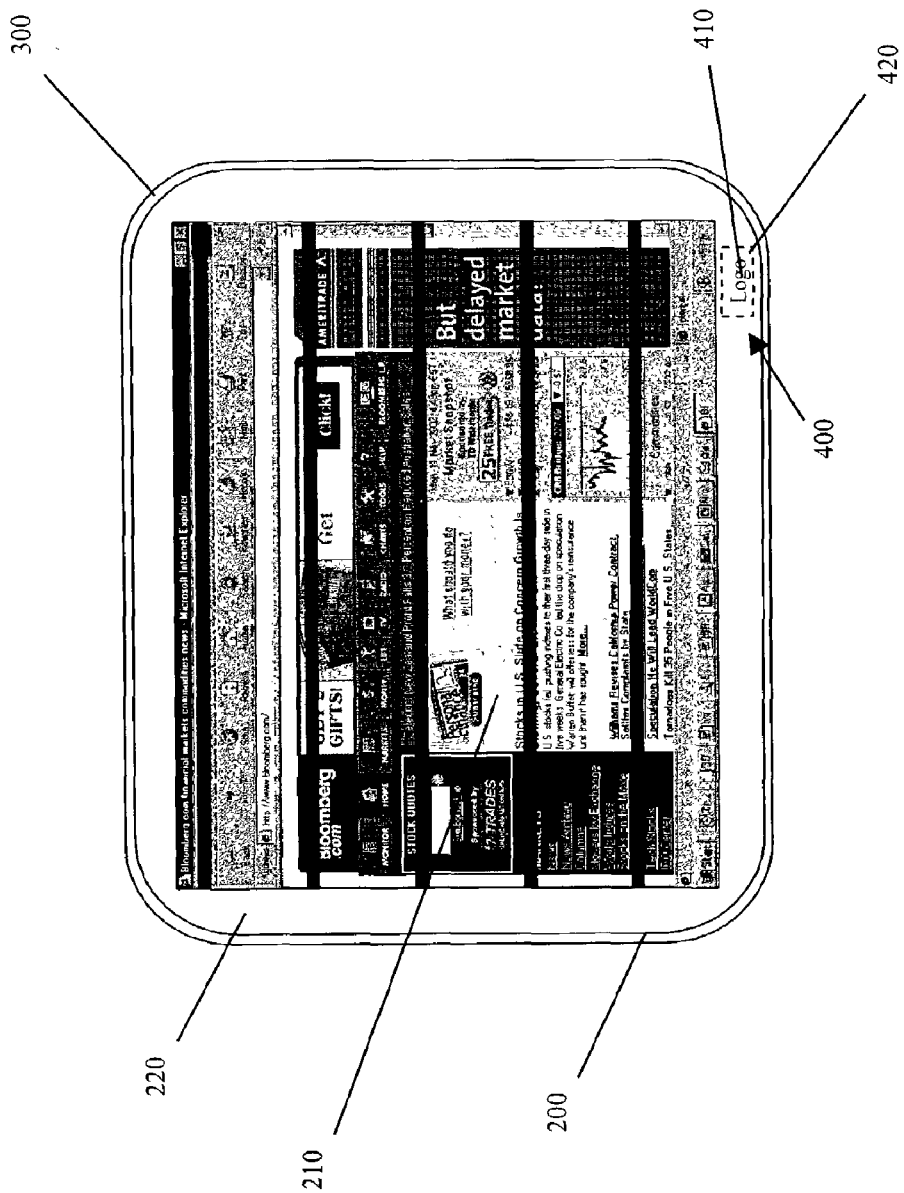
FIG. 5 is a front view of a composite electronic display in accordance with an embodiment of the invention.

Referring to FIG. 1, the cover 200 includes at least a first portion 210 and a second portion 220. A line 230 illustrates the demarcation of the first and second portions 210, 220. However, the line 230 and the demarcation may not be visible, depending upon lighting conditions behind the cover 200. For example, with the cover 200 mounted to the display device 100, and the display device 100 not displaying an image, e.g., having a darkened image displaying portion 110, line 230 is not visible, and the cover 200 has a uniform appearance as shown in FIG. 2. On the other hand, when the display device 100 is displaying an image, e.g., is projecting light in the form of an image, the image will be visible in portion 210 of cover 200, and line 230 will appear as a demarcation between portions 210 and 220, with portion 220 appearing as a flush border to the image appearing in cover portion 210. FIG. 5 depicts the display 10 displaying an image surrounded by a flush border 220, which is shown uncolored but in the preferred embodiment is darkened.

The first and second portions of the cover 200 are sized, and the cover 200 is positioned adjacent to the front side of the electronic display device 100 with the first portion 210 of cover 200 positioned adjacent and at least coextensively with the image-displaying portion 110 of display device 100, and with the second portion 220 of cover 200 positioned adjacent and at least coextensively with the portion 120 of display device 100. The size relationship of the first and second portions 210, 220 of the cover 200 is preferably identical or substantially similar to the size relationship of the image-displaying portion 110 and the other portion 120 of the display device 100. In the embodiment depicted in FIG. 1, the second portion 220 of cover 200 surrounds the first portion 210.

The first portion 210 and second portion 220 of cover 200 each have optical properties selected such that, (a) when images are displayed on image-displaying portion 110 of the electronic display device 100, the displayed images are suitably transmitted through the first portion 210 so as to be visible to a user, and may have a flush border or frame 220, as illustrated in FIG. 5 and, (b) when no images are displayed on the image-displaying portion 110, the first portion 210 and second portion 220 of cover 200 present a uniform appearance such that they present a flush uniform front of the electronic display 100 without a bezel, as illustrated in FIG. 2.

In a preferred embodiment of the invention, the optical properties of second portion 220 are selected so as to completely mask images of other portion 120 and any objects and materials attached to portion 120, and thus prevent them from being transmitted through second portion 220 and being seen by a user. In this embodiment, cover 200 may comprise any suitable structure capable of transmitting light, such as, for example, a glass or plastic sheet, with portions 210 and 220 forming different regions of the sheet. Portions 210 and 220 are provided with optical properties, e.g., tinting, or coloring, or coating(s) such that (a) images of other portion 120 of display device 100 and any objects and materials attached to portion 120 are not visible through second portion 220, and, (b) when images are displayed on image-displaying portion 110 of the electronic display device 100, the displayed images are transmitted through the first portion 210 so as to be visible to a user, and, (c) when no images are displayed on the image-displaying portion 110, the first portion 210 and second portion 220 of cover 200 present a uniform appearance such that they appear to be a single, flush front or cover without a bezel.

The optical properties above may be imparted to second portion 220 of cover 200 by, for example, applying a layer or coating of opaque material, e.g., paint or ink, to the structure comprising cover 200 in the region of second portion 220. In the preferred embodiment, the color of the opaque material is selected so as to match the appearance of image-displaying portion 110 of display device 100 when no images are displayed thereon. This may be accomplished by, for example, obtaining the red, green, and blue color values of the image-displaying portion 110 of display device 100 when no images are displayed thereon, e.g., using a colorimeter, and selecting an opaque material having the same color values.

First portion 210 of cover 200 may be tinted or colored to impart optical properties as described above. In the preferred embodiment, tinting is provided having characteristics that are selected so that, when images are displayed on image-displaying portion 110 of the electronic display device 100, the displayed images are suitably transmitted, e.g., at 80% transmissivity, through the first portion 210 so as to be visible to a user, and yet, when no images are displayed on the image-displaying portion 110, the tint provides an appearance of first portion 210 that matches the appearance of the opaque material applied to second portion 220, which together present the uniform appearance described herein.

In the preferred embodiment, the electronic display device 100 is an LCD panel, and the above described optical properties of the cover can be achieved using an acrylic plastic sheet as cover 200. (An acrylic sheet is sometimes referred to as a lens, although the sheet does not refringe light (e.g., focus or diverge light) as would a lens.) The acrylic sheet is preferably provided with an anti-glare coating (e.g., having a gloss level of 44) and a scratch-resistant coating. Such coatings are known in the art. The second portion 220 of the plastic sheet includes a paint coating 220*a* having a color of standard black as the opaque material forming part of the second portion 220. The first portion 210 includes a tint or coloring tint that does not noticeably alter colors of an image transmitted through portion 210. For example, the first portion 210 may comprise a neutral gray tint (e.g., smoked tint #2064) and be about 80% transmissive.

Figure 3:
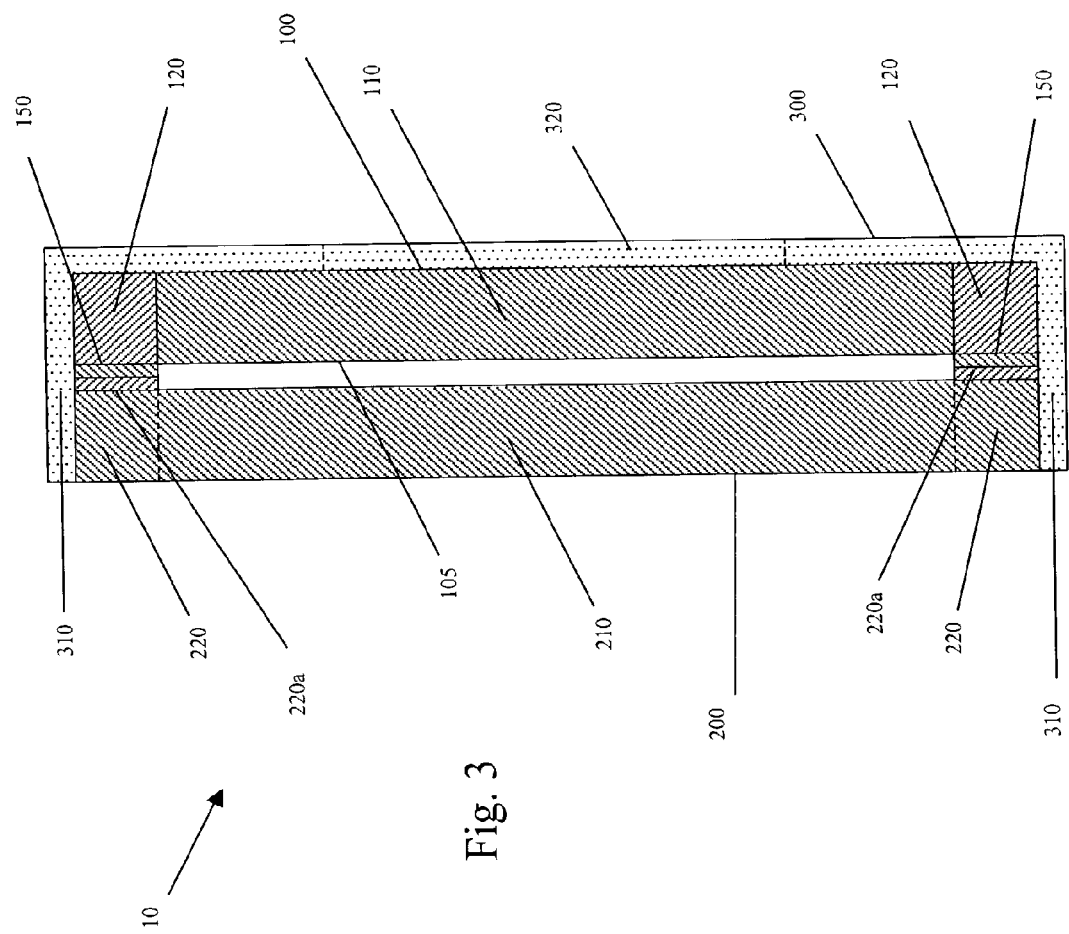
FIG. 3 is a schematic cross-sectional side view of the electronic display depicted in FIG. 1.

The assembly depicted in FIG. 3 includes the cover 200, the display device 100 and the enclosure 300. The second portion 220 of the cover is shown with a coating or layer of opaque material 220*a*. The assembly also includes an adhesive or bonding agent 150 which attaches the cover 200 to the display device 100. The display device is mounted to the enclosure by screws passing through the rear of the enclosure and engaging threaded holes (see FIG. 1) in the frame 120 of the display device. Enclosure 300 comprises a side wall 310 of sufficient height to accommodate at least the thickness of electronic display device 100 and the cover 200. In another embodiment depicted in FIG. 4, the cover is not accommodated within the enclosure but outside the enclosure, as discussed in more detail below. A opening 320 at the rear of enclosure 300 may be provided so as to allow access to the rear of electronic display device 100, where, for example, input and output connectors may be located.

Although the first portion 210 and the second portion 220 are shown in FIG. 1 and described above as separate regions of a single structure comprising cover 200, the portions 210 and 220 may be separate pieces. For example, in an embodiment of the invention, first portion 210 and second portion 220 each may be distinct structures attached in any suitable manner together to form cover 200. In such an embodiment, portions 210 and 220 may be shaped and attached together using known procedures, which may include filling any gaps between the two portions or otherwise providing a desired flush appearance, such that portions 210 and 220 present a bezel-less cover.

Cover 200 may be mounted directly or indirectly (e.g., using a plastic frame as described below) to electronic display device 100 or enclosure 300 in any suitable manner that provides a secure attachment. It is preferred that a fastenless system be used so that fasteners are not visible from the cover 200. For example, cover 200 may be attached to display device 100, by an adhesive or thermal or acoustic bonding, so that cover 200 and display device 100 together form a sub-assembly. In the preferred embodiment, VHB™ Acrylic Foam Tape from the 3M™ Company is used. As shown in FIG. 3, the VHB™ tape 150 may be used to mount cover 200 to electronic display device 100. As assembled, the tape is between the portion 120 of the display device 100 and portion 220 of cover 200 and adheres the two. The tape may first be adhered to the portion 110 of the display device and then the portion of 220 of the cover 200 is adhered to the other side of the tape, or vice versa.

The sub-assembly of the cover 200 adhered to display device 100 using the VHB™ tape, as described above, may be mounted to enclosure 300 by placing the sub-assembly into enclosure 300 (or vise versa) so that cover 200 is flush with the raised edge 310 of enclosure 300 and then fixing the sub-assembly to enclosure 300 using mounting screws placed through holes in enclosure 300 and into the other portion 120 of display device 100.

Figure 4:
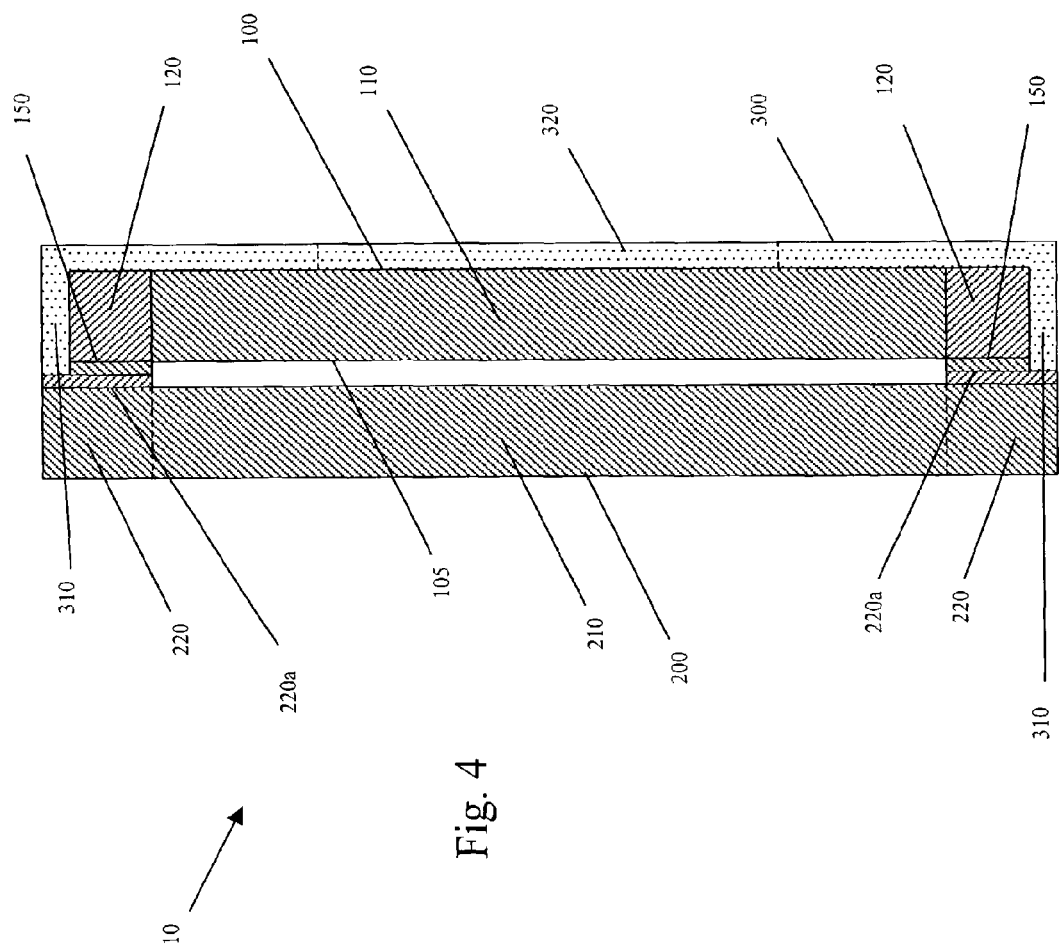
FIG. 4 is a schematic cross-sectional side view of an embodiment of the electronic display in accordance with the invention.

Alternatively, as discussed above, cover 200 may be sized and the sub-assembly comprising cover 200 adhered to display device 100 may be mounted to enclosure 300 such that cover 200 lies on top of the edge of side wall 310 of enclosure 300 flush with the periphery thereof, as shown in FIG. 4. In this an embodiment, second portion 220 of cover 200 covers side wall 310 of enclosure 300 as well as the other portion 120 of display device 100. The sub-assembly may be fixed to enclosure 300 in the same manner as described above using screws entering the electronic display 10 from the rear of the enclosure 300.

Where portion 220 has optical properties that completely mask whatever is behind it, then, when images are displayed on image-displaying portion 110 of display device 100, portion 220 appears as an opaque, flush border or frame for portion 210. Unlike conventional displays, with a bezel that protrudes from the display screen, portion 220 is part of or appears to be part of the same structure comprising portion 210, and does not protrude from portion 210, but rather is flush or coplanar with portion 210.

FIG. 5 depicts an embodiment of the invention that includes a secondary display device 400 that presents one or more images (represented by "Logo") independently of display device 100, which is referred to as the main display device in this embodiment. In one embodiment, the secondary display device 400 comprises an area 410 of the second portion 220 of cover 200 that is modified to form an image, such as, for example, a corporate logo, advertisement, licensed character, or personalized image or message, etc., and a light source 420 located behind this area 410 that transmits light through area 410 to present the image.

Where the second portion 220 of cover 200 includes an opaque coating 220a (FIG. 3), area 410 may be formed by, for example, omitting opaque material in the form of the image. For instance, where paint is used as the layer of opaque material and is applied to second portion 220, any suitable masking or etching process may be employed.

Figure 6:
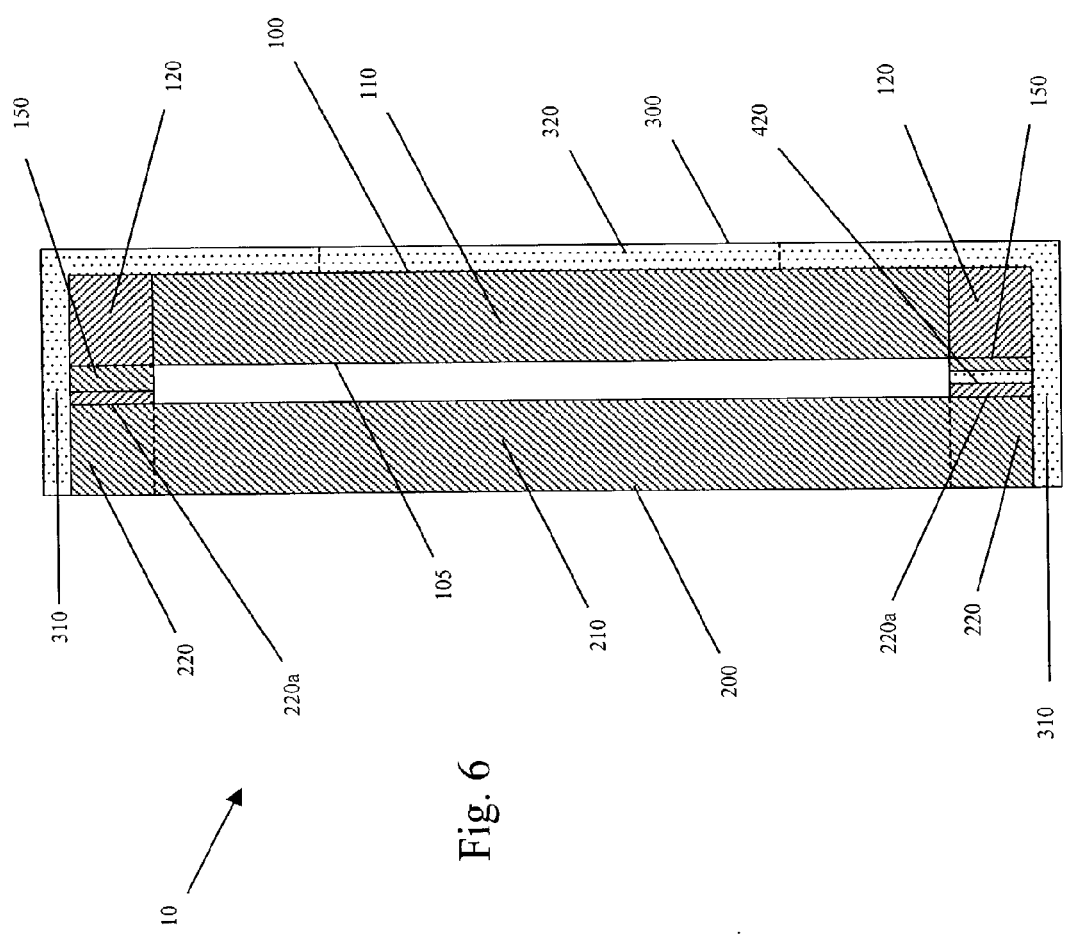
FIG. 6 is a schematic cross-sectional side view of the composite electronic display depicted in FIG. 5.

The light source 420 may be any suitable source of light, such as an LCD or an LED. In the preferred embodiment, an LED assembly of the type commercially available from Global Lighting Technologies, Inc., as, e.g., the MicroLens™ LED, is used. The assembly is mounted behind the area 410 in any manner suitable to fix it securely between the cover 200 and the other portion 120 of the display device, and to direct light to area 410. For example, an adhesive or other bonding system, or fasteners, may be used to attach the light assembly 420 to the frame 120 of the display device 100. In the preferred embodiment, the light assembly 420 may be mounted by adhering it to the VHB™ tape placed on other portion 120 of the display device 100 at the position behind area 410, as shown in FIG. 6. Since the VHB™ tape is compliant, the assembly 420 may be depressed into the VHB™ tape so that, when the cover 200 is adhered to the VHB™ tape and the other portion 120 of display device 100, the VHB™ tape forms a seal around the assembly 420 that prevents light from the LED from leaking into the area behind the first portion 210 of cover 200 that may otherwise be visible to a user or an observer. If desired, a foam gasket may be placed around the assembly 420 to ensure that no light leaks from the LED. The light source is powered by known means independently of the electronic display device 100 and can remain on even when the display device 100 is off or in an inactive "sleep" mode. For example, the power can be derived from the AC lines (as long as the display 10 remains connected to AC power), or by battery power.

Figure 7:
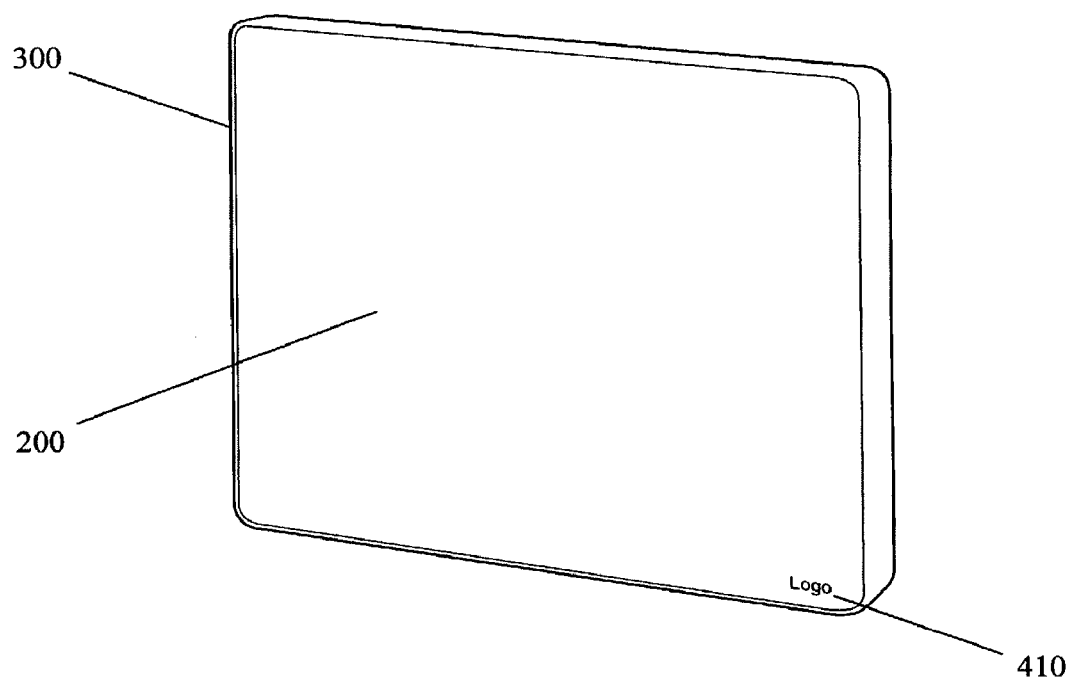
FIG. 7 is a perspective view of a composite electronic display in accordance with an embodiment of the invention.
Figure 8:
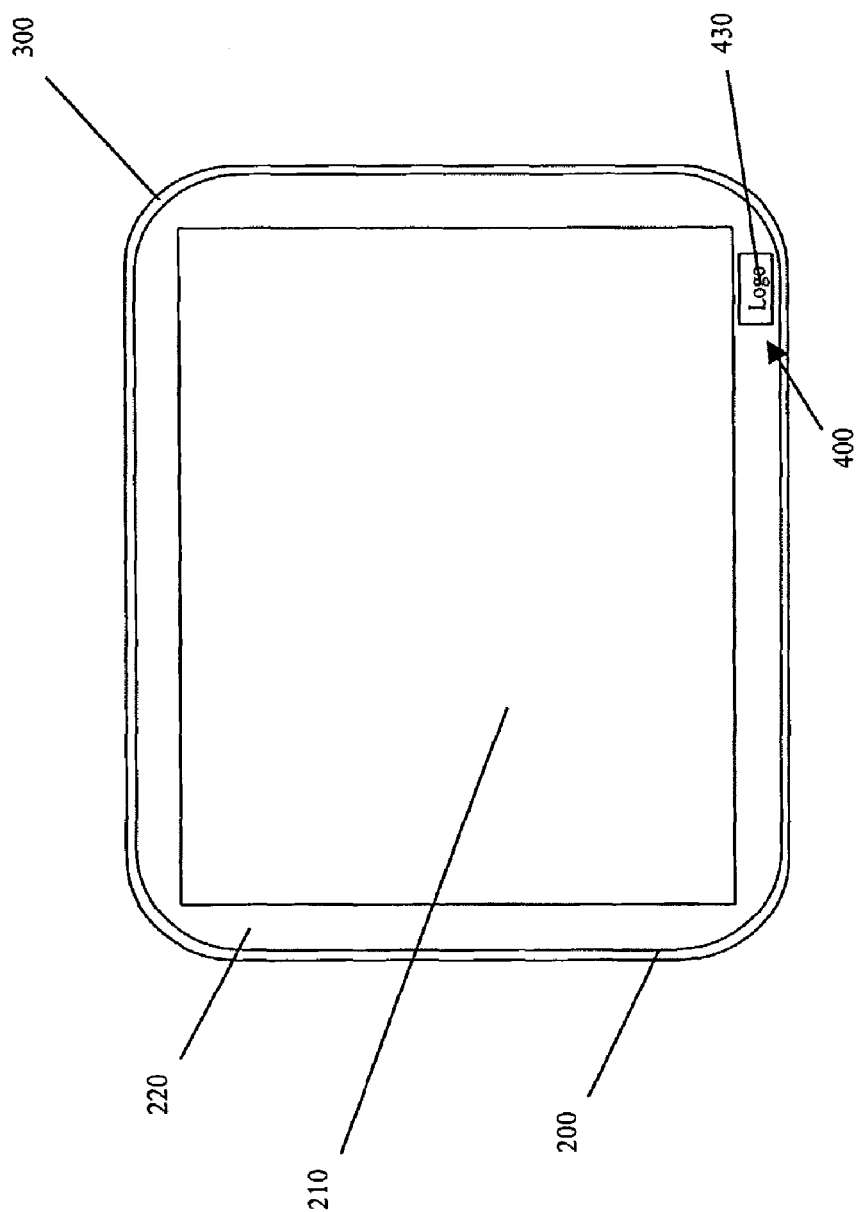
FIG. 8 is a front view of another embodiment of a composite electronic display in accordance with the invention.

The portions of area 410 that do not form the image preferably have the same optical properties as portion 210. Thus, as shown in FIG. 7, when no images are presented on image-displaying portion 110 of display device 100, portions 210 and 220 of cover 200 present a uniform appearance as described above, except for the image presented by secondary display 400. In another embodiment of the invention, shown in FIG. 8, the image presented by the secondary display device 400 comprises a plate or cover 430 mounted on the exposed side of cover 200 overlying adjacent a light source (not shown), as described above. The image on plate or cover 430 may be formed as described above. The plate or cover 430 may also be mounted on the inside of cover 200 which then includes a light transmitting section in portion 220 overlaying the plate.

Figure 9:
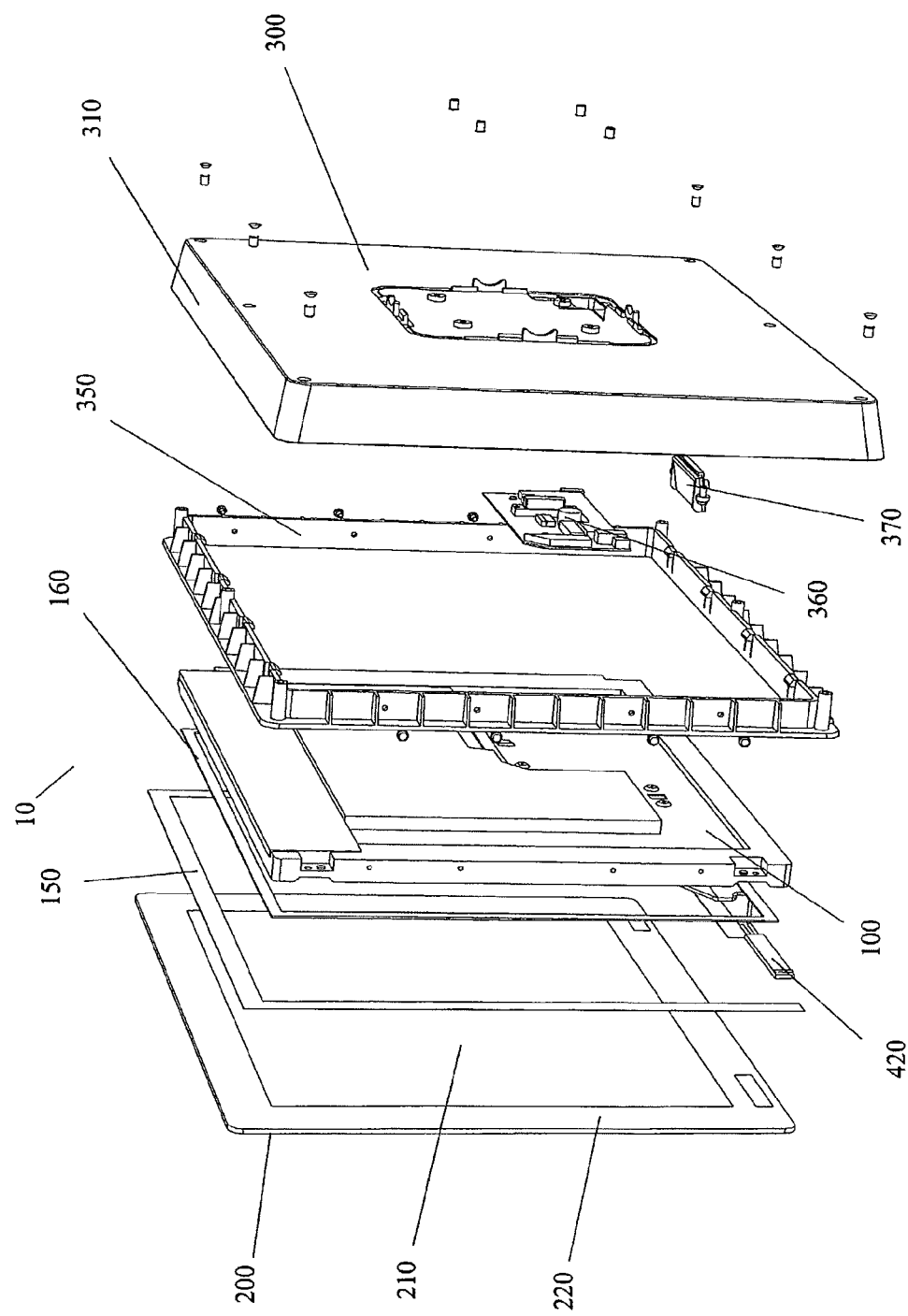
FIG. 9 is an exploded perspective view of an electronic display in accordance with an embodiment of the invention.
Figure 10:
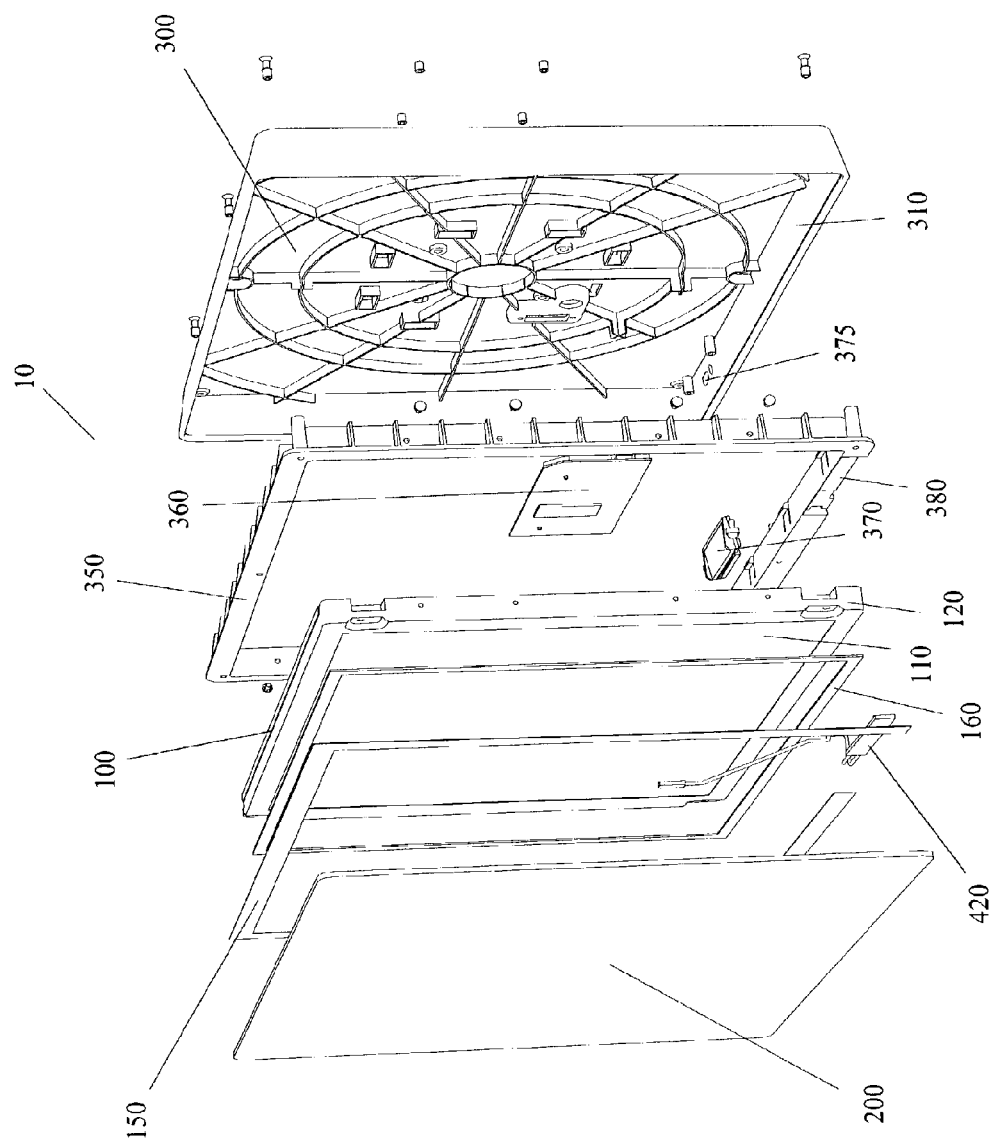
FIG. 10 is an exploded perspective view of an electronic display in accordance with an embodiment of the invention.

Another embodiment of the invention is shown in FIGS. 9 and 10. An electronic display 10 comprises an electronic display device 100, a cover 200, and an enclosure 300, as previously described above. The display device 100 fits into a plastic frame 350 and is attached thereto by any suitable means, such as, for example, screws entering the sides of the frame 350 and into the sides of the other portion 120 of display device 100. Attached to the front of the display device 100, on other portion 120, is a dust gasket 160. Dust gasket 160 may be attached to other portion 120 by any suitable means, such as, for example, an adhesive. A light assembly 420, as described previously, fits into a notch 380 at a location within the frame 350 beneath the display device 100. The light assembly 420 may be attached to the frame 350 at notch 380 by any suitable means, such as, for example, an adhesive.

Cover 200 is bonded to frame 350 in any suitable manner, such as, for example, using VHB™ tape 150, as described previously. A printed circuit board ("PCB") 360, providing power and input and output connections, attaches to the back of display device 100 in any suitable manner, such as, for example, fasteners, e.g., screws, or an adhesive. A button mounting board 370 mounts under the frame 350 in any suitable manner, such as, for example, using an adhesive, and provides buttons for controlling the display device 100, e.g., on/off and brightness buttons. Buttons from the button mounting board 370 extend down through holes 375 in a bottom sidewall 310 of enclosure 300 where they may be accessed by a user. The components above, i.e., frame 350, display device 100, dust gasket 160, cover 200, light assembly 420, PCB board 360, and button mounting board 370 form a sub-assembly that is then mounted to enclosure 300 in any suitable manner, such as, for example, screws entering through the back of enclosure 300 and into the back of frame 350.

While the invention has been described and illustrated in connection with preferred embodiments, many variations and modifications as will be evident to those skilled in this art may be made without departing from the sprit and scope of the invention, and the invention is thus not to be limited to the precise details of methodology or construction set forth above as such variations and modification are intended to be included within the scope of the invention.

What is claimed is:

1. An electronic display without a bezel, comprising:
   an electronic display device comprising an image-displaying portion and another portion adjacent the image-displaying portion along at least one side, the image-displaying portion selectively projecting light to generate images and not projecting light, and the other portion not projecting light and not generating images; and
   a cover positioned adjacent the electronic display device, the cover including a first portion having first optical properties positioned adjacent the image-displaying portion of the display device and a second portion having second optical properties positioned adjacent the other portion of the display device, the first optical properties of the first portion of the cover being such that the first portion substantially transmits light projected from the image-displaying portion, and the first optical properties of the first portion and the second optical properties of the second portion being such that the cover presents an appearance of a uniform cover without a bezel when light is not projected from the image-displaying portion.

2. The electronic display of claim 1 wherein, the second portion comprises an opaque material comprising optical properties matched to those of the first portion so that the first and second portions present the appearance of a uniform cover without a bezel when light is not projected from the image-displaying portion.

3. The electronic display of claim 1 wherein, the second portion comprises an opaque material, and the opaque material and the first portion comprise color values such that the first and second portions present the appearance of a uniform cover without a bezel when light is not projected from the image-displaying portion.

4. The electronic display of claim 1 wherein, the second portion comprises an opaque material and the first portion comprises tinting that provides an appearance of the first portion that matches an appearance of the opaque material and which together present the appearance of a uniform cover without a bezel when light is not projected from the image-displaying portion.

5. The electronic display of claim 1 wherein, the cover comprises a plastic, light-transmitting sheet and the second portion comprises an opaque layer on the plastic sheet, the opaque layer and the plastic sheet in the first portion of the cover together presenting the appearance of a uniform cover without a bezel when light is not projected from the image-displaying portion.

6. An electronic display without a bezel, comprising:
   an electronic display device comprising an image-displaying portion and another portion adjacent the image-displaying portion along at least one side, the image-displaying portion selectively projecting light to generate images and not projecting light, and the other portion not projecting light and not generating images; and
   a cover positioned adjacent the electronic display device, the cover including a first portion having first optical properties positioned adjacent the image-displaying portion of the display device and a second portion having second optical properties different from the first optical properties positioned adjacent the other portion of the display device, the first optical properties of the first portion of the cover being such that the first portion substantially transmits light projected from the image-displaying portion, and the first optical properties of the first portion and the second optical properties of the second portion being such that the cover presents an appearance of a uniform cover without a bezel when light is not projected from the image-displaying portion.

* * * * *